United States Patent [19]

West

[11] Patent Number: 4,587,449
[45] Date of Patent: May 6, 1986

[54] PERMANENT MAGNET ROTARY DYNAMO ELECTRIC MACHINE

[75] Inventor: John G. W. West, Pershore, England

[73] Assignee: Lucas Industried Limited, Birmingtham, England

[21] Appl. No.: 552,330

[22] Filed: Nov. 16, 1983

[30] Foreign Application Priority Data

Nov. 22, 1982 [GB] United Kingdom ............... 8233268

[51] Int. Cl.⁴ ............................................. A02K 21/26
[52] U.S. Cl. ..................................... 310/154; 310/190
[58] Field of Search ............................. 310/190–193, 310/181, 154, 254

[56] References Cited

U.S. PATENT DOCUMENTS

| | | | |
|---|---|---|---|
| 2,513,226 | 6/1950 | Wylie | 310/154 |
| 2,610,993 | 9/1952 | Stark | 310/190 |
| 3,021,443 | 2/1962 | Tamm | 310/190 |
| 3,083,310 | 3/1963 | Tweedy et al. | 310/190 X |
| 3,612,929 | 10/1971 | Volkrodt | 310/190 |
| 3,772,546 | 11/1973 | Means | 310/154 |
| 4,471,252 | 9/1984 | West | 310/154 |

Primary Examiner—Donovan F. Duggan
Attorney, Agent, or Firm—Holman & Stern

[57] ABSTRACT

A permanent magnet rotary dynamo electric machine wherein each permanent magnet pole is equipped with a flux shunt which provides a direct flux path between the airgap at the strong tip region of the pole and the iron circuit upon which the pole is supported, the direct flux path shunting magnetic flux to the iron circuit when the current in the associated winding is low, but being saturated by flux flowing in the opposite direction at high values of winding current.

19 Claims, 22 Drawing Figures

PERMANENT MAGNET ROTARY DYNAMO ELECTRIC MACHINE

This invention relates to permanent magnet rotary dynamo electric machines of the kind wherein relative rotation occurs between a plurality of permanent magnet poles, and a plurality of wound poles, the wound poles being wound in the sense that they have associated therewith electric current carrying conductors. Thus the term permanent magnet rotary dynamo electric machine is intended to include direct current (d.c) and alternating current (a.c.) machines, both motors and generators, both those wherein the permanent magnet poles are carried by a rotor which rotates within or around a wound stator, and the more usual arrangement wherein the permanent magnet poles form part of the machine stator and a wound armature rotates within the confines thereof.

In such permanent magnet machines there is of course an air gap between the rotor and the stator, and the magnetic field of each permanent magnet pole coacts in use with the magnetic field of the wound poles movable relative thereto, the field of wound poles being generated by electric current flowing in the associated winding conductor. In a motor the current flow generates the relative movement between the stator and the rotor whereas in a generator relative motion between the rotor and the stator generates the current flow. The interaction of the two magnetic fields gives rise to a well understood phenomenon known as "armature reaction". The effect of armature reaction is to increase the magnetic flux density towards one tip of the permanent magnet pole at the expense of decreasing the flux density towards the opposite tip of the permanent magnetic pole. The tips of the permanent magnet poles referred to in the preceding sentence are the opposite end regions of the pole in relation to the direction of relative rotation of the rotor and stator and are normally referred to as the leading and trailing tips respectively of the pole. However, armature reaction in a d.c. motor increases the flux density towards the leading tip, whereas in an equivalent generator the flux density is increased towards the trailing tip. Since the present application is concerned with both generators and motors it is more convenient to refer to the permanent magnet poles as having, as a result of armature reaction, a strong tip (the end region of the permanent magnet pole at which the armature reaction gives rise to an increased flux density) and a weak tip (the end region of the permanent magnet pole at which armature reaction gives rise to a decreased flux density).

Permanent magnet electric motors operated on direct current (d.c.), either rectified a.c. or pure d.c., are known to exhibit an operating characteristic similar to a conventional shunt wound field electric motor. Thus a permanent magnet motor can be expected to have a lower rotational speed under low load conditions and to have a lower torque at stall than a comparable conventional series wound field motor.

It is an object of the present invention to provide a permanent magnet field electric motor wherein the low load speed, and the stall torque are enhanced.

A d.c. permanent magnet generator exhibits a relatively small voltage difference between a low current operating condition and a high current operating condition and it is an object of the present invention to provide a d.c. permanent magnet generator wherein this voltage difference is increased so that the disadvantageous effect of resistive voltage drop in the machine is reduced.

It is a further object of the present invention to provide an improvement in the performance of permanent magnet a.c. generators. It is a still further object of the invention to provide a permanent magnet rotary dynamo electric machine having improved resistance to demagnetisation of the permanent magnet poles.

In a permanent magnet rotary dynamo electric machine according to the present invention each permanent magnet pole is provided with a flux shunt in the form of a shield of material of high saturation flux density engaging the air gap face of the strong tip region of the pole and also engaging the part of the iron circuit of the machine upon which the permanent magnet pole is supported so as to provide a direct flux path between the air gap at the strong tip region of the pole and the iron circuit, said direct flux path being arranged to shunt magnet flux to the iron circuit when the current in the associated winding is low, but to be saturated at high values of winding current.

It will be recognised that normally, in for example a d.c. permanent magnet motor, the permanent magnets will be supported on the stationary yoke of the machine and there will be an associated wound armature. Thus at low armature currents the flux shunt will provide a direct path from the air gap to the yoke for the armature flux. The effect of the flux shunt is to provide an even higher flux density at the strong tip of the poles and thus to give an increased stall torque. Similarly in low load conditions where the current flowing in the wound armature is low the shunting of flux to the yoke results in increased armature speed at low torque. At low armature currents therefore each shunt "shorts out" that part of its respective magnet which lies beneath the part of the shunt which engages the air gap face of the magnet. The length, in a circumferential direction of the magnet which is "shorted out" thus depends upon the length of the overlying part of the shunt and this dimension together with the flux carrying ability of the "direct flux path" part of the shunt are chosen such that desirably, at low armature current values, the shunt "direct flux path" part carries the "shorted" magnet flux at just below its saturation flux density. If this desideration is achieved then no significant amount of flux is provided to the armature from the "shorted out" part of each magnet, resulting in an increased armature speed and correspondingly reduced torque.

However the determination of the flux carrying ability of the "direct flux path" part of the shunt must also take account of the need for the "direct flux path" part of the shunt to be saturated at high armature current values. Thus it is necessary, at high armature current values, for the shunt to be saturated by the flux due to armature reaction, so causing an MMF to be created across the shunt and the magnet which will then provide useful flux via the part of the shunt which engages the magnet airgap face, across the machine airgap into the armature teeth. In this manner the flux density in the armature teeth will be limited to an acceptable maximum value that will both limit cogging torque and losses associated with flux pulsation.

When considering a wound stator/permanent magnet rotor machine references to armature current should be read as references to stator current and thus above the term "winding current" is utilized. While the foregoing explanation relates to motors it will be recognised that similar criteria apply to the choice of the material and dimensions of the shunts in a generator, and that in all cases the exact criteria will be determined in relation to the desired performance characteristics of the machine.

Desirably the flux shunt is physically secured to the part of the iron circuit upon which the permanent magnet pole is supported, and forms part of the means securing the permanent magnet pole to said part of the iron circuit.

Conveniently each flux shunt is part of a pole securing clip, and the number of pole securing clips is equal to the number of poles, each pole securing clip being anchored to the part of the iron circuit upon which the permanent magnet poles are supported, at a position between circumferentially adjacent poles, and each clip having a first portion defining the flux shunt engaging the strong tip region of one of its adjacent poles, and a second portion constituting a weak tip shield of the next circumferentially adjacent pole.

Weak tip shielding forms the subject of our co-pending British Patent Application No. 8135844 to which the reader's attention is directed.

As an alternative to the use of a plurality of clips each flux shunt is part of a single annular member formed from a material of high saturation flux density, the annular member engaging, at least by means of the flux shunts, each of the permanent magnet poles, and serving as at least part of the means for securing the poles to the part of the iron circuit of the machine upon which the poles are supported.

Conveniently in addition to incorporating the appropriate number of flux shunts, the single annulus incorporates an equal number of appropriately positioned weak tip shields.

Desirably the parts of the air gap surface of the permanent magnet poles which are engaged by the flux shunts are recessed to receive the flux shunts so that the air gap surface of the flux shunt is flush with the remainder of the air gap surface of its respective permanent magnet pole.

Conveniently the length of the airgap face of each magnet which is engaged by the respective shunt is not greater than 50% and not less than 10% of the length of the airgap face of the magnet measured in a circumferential direction.

Desirably the airgap face coverage is not greater than 40% and not less then 20%.

Conveniently part of the circumferential extent of a permanent magnet pole is replaced, at the strong tip end thereof, by a steel pole member associated with the respective flux shunt.

Desirably the flux shunt extends over the whole axial length of the respective pole and terminates, in a circumferential direction, short of the edge of the strong tip region of the pole.

Figure 1:
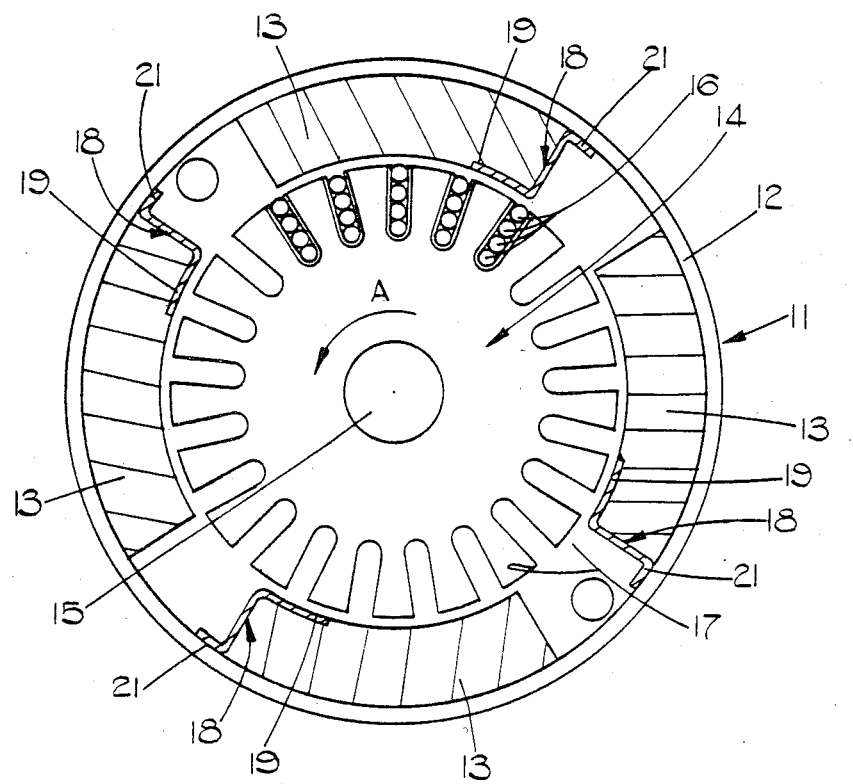
FIG. 1 is a transverse cross-sectional view of a d.c. permanent magnet field electric motor in accordance with a first example of the invention.

Referring first to FIG. 1 of the drawings wherein there is illustrated a permanent magnet field d.c. (either pure d.c. or rectified a.c.) motor it can be seen that the stator 11 of the motor includes a cylindrical mild steel yoke 12 to the inner surface of which are attached four equi-angularly spaced, arcuate, permanent magnet poles 13. The yoke 12 carries at its opposite axial ends bearings for a shaft 15 of the wound rotor 14 of the machine. The wound rotor 14 has a laminated core of conventional form which rotates within the cylindrical volume bounded in part by the inner part cylindrical faces of the poles 13, there being an air gap between the outer surface of the rotor 14 and the radially innermost arcuate faces of the poles 13.

As is conventional the core of the rotor 14 has a plurality of equi-angularly spaced axially extending slots within which are housed the rotor winding conductors 16. The material of the core between the slots defines wound poles 17 of the rotor. As is conventional the shaft 15 carries a commutator to which the rotor winding conductors 16 are electrically connected in known manner such that when current flows in the windings 16 the rotor is caused to rotate.

The poles 13 are formed from permanent magnet material having a relatively high coercivity and relatively low remanence, conveniently the material known generally as "ferrite". The material may in fact be barium ferrite or strontium ferrite or a mixture of both. It is to be understood however that other permanent magnet materials could be utilized. Each pole 13 is in the form of a segment of a cylinder and the poles 13 are positioned with their cylindrical axes coincident and co-extensive with the axis of the yoke 12 and shaft 15. Thus it can be seen that the direction of rotation of the rotor 14 (as defined by arrow A) is counter-clockwise rotation and thus the clockwise circumferential half of each of the poles 13 can be considered to be the leading part of the pole while the counter-clockwise circumferential half of each pole can be considered to be the trailing part. Since the machine is a d.c. motor it will be recognised that when current flows in the windings 16 armature reaction will occur and the effect of armature reaction will be to concentrate flux density in the leading part of each pole and to reduce flux density in the trailing part of each pole. Thus in the example illustrated in FIG. 1 the clockwise end region of each pole is the strong tip and the counter-clockwise end region of each pole is the weak tip.

Associated with the strong tip of each of the poles 13 is a flux shunt 18 in the form of a generally S-shaped component. The flux shunts are each formed from mild steel, the primary requirement being that the flux shunt material is a material of high saturation flux density. Each flux shunt extends along the full axial length of its respective pole, and includes a first limb 19 which is inset into the air gap surface of the strong tip of its respective permanent magnet pole 13. A second parallel limb 21 extends in the opposite direction to the limb 19 and is engaged with the inner cylindrical surface of the yoke 12. A radially extending limb interconnects the limbs 19 and 21.

The effect of each flux shunt 18 at low armature currents is to provide a direct path for conducting flux directly between the air gap and the yoke. In a high armature current situation the increased flux density (by virtue of armature reaction) at the strong tip of the pole is further increased by the presence of the shunt, the radial limb of which saturates, and this has the effect of increasing the stall torque of the motor. At low load, i.e. when the current flowing in the armature winding conductors 16 is low, the shunt diverts some of the magnet flux directly to the yoke causing an increase in armature speed by comparison with a comparable permanent magnet motor not equipped with the shunts 18. Thus the addition of the shunts 18 changes the operating characteristic of the permanent magnet motor at stall and low load conditions from a characteristic equating to the shunt wound field machine to approach the characteristics of a series wound field machine.

When determining the flux carrying capability of the radial portion of each of the shunts 18, that is to say the nature and thickness of the material of the radial portion, it should be recognised that when the machine is operated at high winding currents (armature currents in the case of a wound rotor machine and stator currents in the case of a wound stator machine) the radial portion of each shunt is to become saturated by the flux due to armature reaction. When the radial portion of each shunt is saturated the MMF which is created across the shunt and the permanent magnet pole will provide useful flux to the armature by way of the portion 19 of the shunt. It will be recognised that the flux density in the armature teeth or poles will thus be limited to a maximum value at which both cogging torque and losses associated with flux pulsations are limited to an acceptable value. However, it must also be borne in mind that at low winding current the radial portions of the shunts should not be saturated in order that the shunts can "short out" that part of their respective permanent magnet which lies beneath the portion 19 of each shunt. The flux carrying capability of the radial portion of each shunt and the length, in a circumferential direction, of the portion 19 of each shunt are desirably so chosen that the radial portion of each shunt carries the "shorted" permanent magnet pole flux at just below the saturation flux density of the shunt radial portion so that no significant amount of flux is provided by the region of the permanent magnet pole beneath the portion 19 of the shunt. Thus in the case of a motor having a wound armature that portion of each permanent magnet pole beneath the portion 19 of its respective shunt does not provide a significant amount of flux to the armature so that in low armature current conditions the armature speed is increased by comparison with a similar machine not equipped with shunts, and the torque is reduced by approximately the same proportion as the speed is increased.

Figure 2:
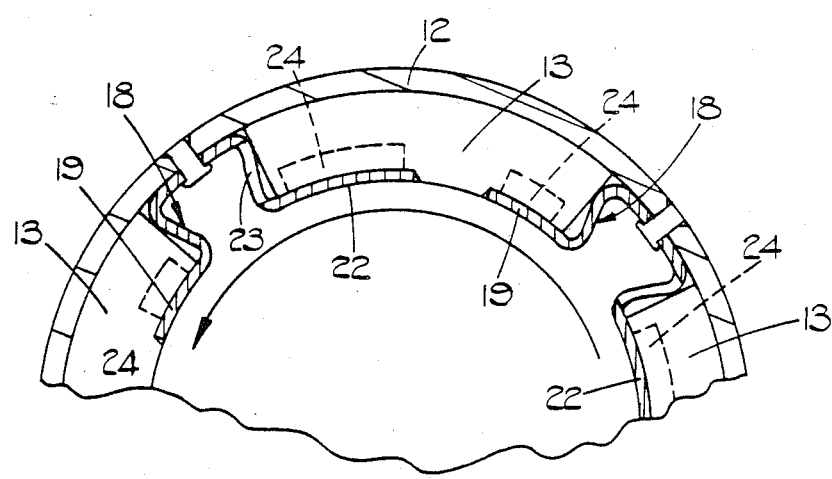
FIG. 2 is a fragmentary view similar to FIG. 1 of a motor in accordance with a second example of the present invetion.

It is recognised that there are problems in securing the permanent magnet poles to the part of the iron circuit upon which they are supported. In the case of FIG. 1 the supporting part of the iron circuit is of course the yoke. However, in a machine where the stator is wound and the rotor carries the permanent magnets then the part of the iron circuit will be the rotor core. The shunts 18 conveniently are secured to the yoke 11 to ensure a low reluctance connection thereto. Thus since the shunts 18 are preferably anchored to the yoke, and also overlie the strong tip of each pole 13 then it is convenient to utilize the shunts 18 as part of the means for securing the poles 13 in position. FIG. 2 illustrates a modification of the basic form of shunt 18 shown in FIG. 1. In FIG. 2 each shunt 18 is part of a mild steel clip riveted to the yoke 12 between circumferentially adjacent poles. Each clip in addition to defining a shunt 18 also provides a weak tip shield 22 for the circumferentially adjacent pole 13. The concept of weak tip shielding is disclosed in detail in our co-pending British Patent Application No. 8135844 and the attention of the reader is directed to this co-pending British Patent Application. It is important that the weak tip shield 22 does not constitute a shunt whereby magnetic flux passes directly from the air gap at the weak tip end of the pole to the yoke. Thus it can be seen that the radial limb of the clip connected to the shield 22 has a large aperture 23 therein. In effect therefore there is a negligible amount of flux conductive material within the clip between the yoke 12 and the shield 22. Just sufficient material is retained within this limb to preserve the structural integrity such that the part of the clip defining the shield 22 can also form part of the means securing each pole 13 to the yoke 12. As with the portion 19 of the shunts 18 the shields 22 are desirably inset into the surface of the poles 13.

FIG. 2 illustrates, in broken lines, that the portion 19 of each shunt, and each shield 22 can, for the purposes of locating the permanent magnet poles 13, incorporate flanges 24 which engage the opposite axial ends of the poles 13.

As an alternative to using a number of clips (equal in number of the number of poles) each weak tip shield and strong tip flux shunt could be a separate mild steel pressing or fabrication individually secured to the yoke by rivets or the like so as to serve its appropriate magnetic function while at the same time providing a pole retaining function.

Figure 3:
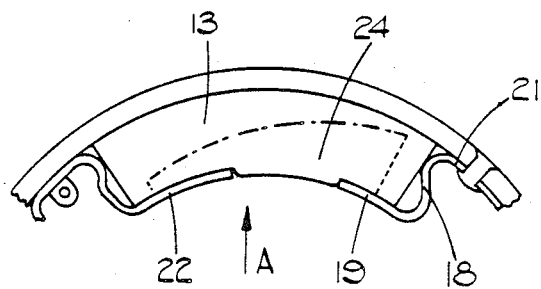
FIG. 3 is a view similar to FIG. 2 of a third example of the invention.
Figure 4:
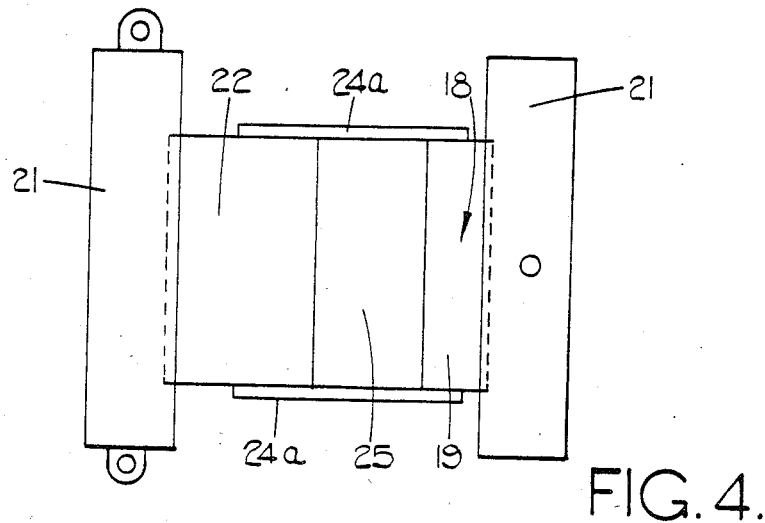
FIG. 4 is a view in the direction of arrow A in FIG. 3.
Figure 5:
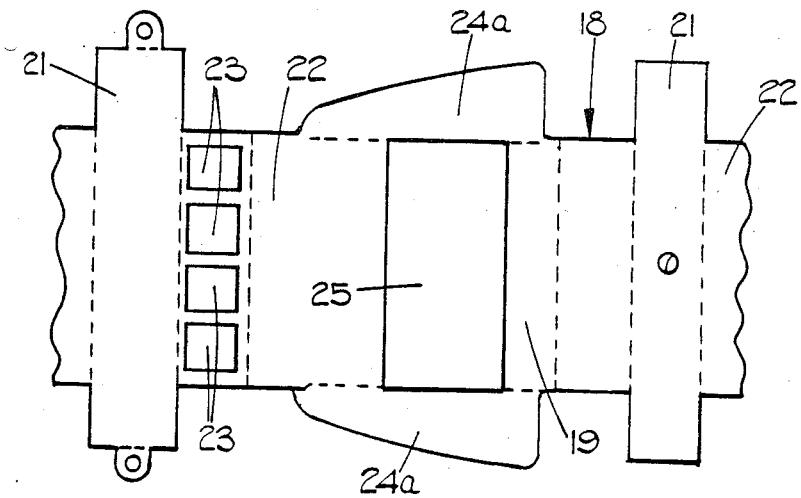
FIG. 5 is a developed plan view corresponding to FIG. 4.

FIGS. 3, 4, and 5 illustrate an alternative to the use of separate clips of the kind shown in FIG. 2. In FIGS. 3, 4, and 5 the weak tip shields 22 and the strong tip shunts 18 are parts of a hoop of mild steel. The interconnection of the part 19 of each shunt with the weak tip shield 22 of the same pole 13 is by means of shaped flanges 24a which engage respectively opposite axial ends of the pole 13. In FIG. 4 it can be seen that there is a generally centrally disposed aperture 25 in each pole section of the hoop through which the arcuate inner face of the pole 13 is exposed. FIG. 5 is a developed view in effect illustrating a section of the blank which is bent to define the hoop. Of particular note are the aperture 23 in that section of the blank lying between each weak tip shield 22 and the adjacent part 21 which in use engages the inner surface of the yoke. The provision of the apertures 23, as mentioned above, removes flux conducting material so that the shield 22 does not constitute a shunt for flux at the weak tip of the respective pole 13. It will be recognised that the hoop for co-operation with all of the poles 13 can be produced by a stamping operation performed on an appropriately long strip of mild steel, the stamped blank then being bent generally along the broken lines illustrated in FIG. 5, and then having its two ends joined to define a hoop. Where no additional securing means is provided for the permanent magnet poles 13 then the permanent magnet poles 13 can be assembled into the appropriate "pockets" defined in the exterior of the hoop, and the hoop together with the permanent magnets can then be slid into the yoke 12. Thereafter the hoop is riveted, at appropriate points, to the yoke.

As an alternative to riveting the ends of the hoop, between a pair of adjacent poles, can be trapped in position by a non-magnetic tapered wedge driven into the interpolar space. The wedge provides a secure fixing and tends to expand the hoop outwardly to firmly engage the pole faces and the yoke.

Figure 6:
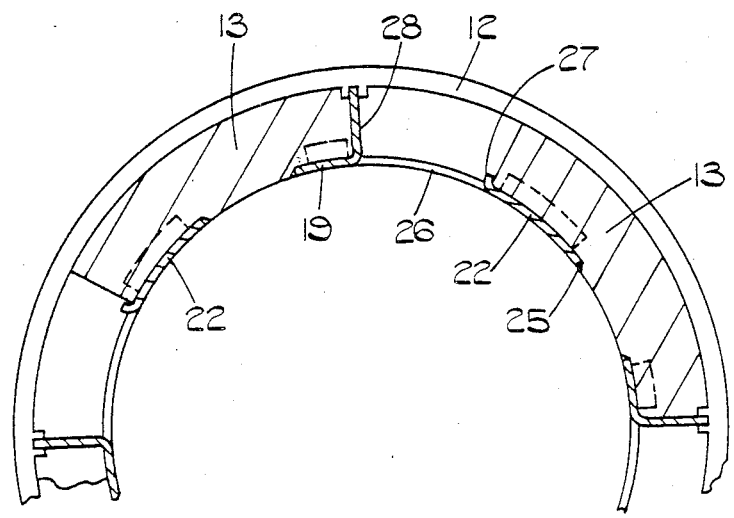
FIG. 6 is a view similar to FIG. 3 of a further example of the present invention.
Figure 7:
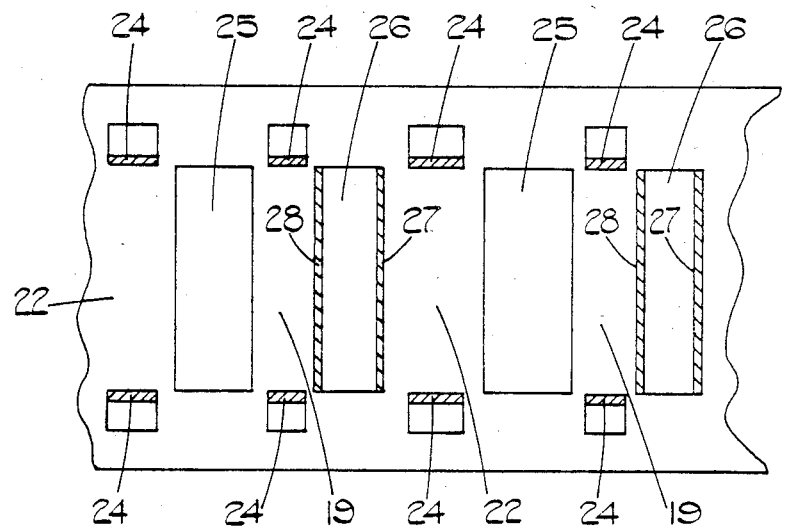
FIG. 7 is a developed view of the pole retainer of FIG. 6.

FIGS. 6 and 7 illustrate an alternative hoop-type construction. The construction illustrated in FIGS. 6 and 7 involves considerably less shaping than the construction of FIGS. 3, 4, and 5. A substantially plane strip of mild steel is stamped to produce apertures 25 interspaced with apertures 26. The transverse edges of the apertures 26 are bent to one side of the plane of the strip to define a very low upstanding wall 27 and a higher upstanding wall 28, the height of the upstanding wall 28 being equal to the radial thickness of the permanent magnet poles 13. In addition the strip is stamped to produce a plurality of upstanding flanges 24. The strip is then bent to form a cylinder with the flanges 24, 27, 28 projecting radially outwardly therefrom. As can be seen in FIG. 6 the spacing between the apertures 26 on the strip is equal to the circumferential spacing between the poles 13, and the upstanding flanges 28 extend across the circumferential strong tip face of their respective pole 13 to engage the yoke 12. Thus each flange 28 with the adjacent cylindrical part 19 of the hoop which overlies the strong tip of the respective pole 13, constitutes the flux shunt for that respective pole. The very low upstanding flanges 27 are so positioned in relation to the flanges 28 that they engage the weak tip end faces of the poles 13, but are of insufficient height to engage the yoke 12. Thus there is no danger of there being a flux shunt at the weak tip ends of the poles. The flanges 24 engage the opposite axial ends respectively of the poles 13 to provide an axial location of the poles 13 relative to the hoop and the yoke 12. The apertures 25 space the weak tip shield portions 22 from the shunt portions 19, and it will be recognised that only relatively narrow necks of the material of the strip interconnect the shield portions 22 with the shunt portions 19. Thus in effect the shield portions 22 and shunt portions 19 are not magnetically interconnected by the hoop since the narrow necks provide a severe restriction to flux flow.

The radially outermost ends of the flanges 28 are received in axially extending channel formations provided on the interior of the yoke 12 although as an alternative the channel formations may be replaced by localized radial projections defined by half shearing the yoke to produce internal projections and corresponding external depressions. Any convenient axial location means is provided to locate the assembly of the hoop and the permanent magnet poles 13 in the appropriate axial position within the yoke 12.

Figure 8:
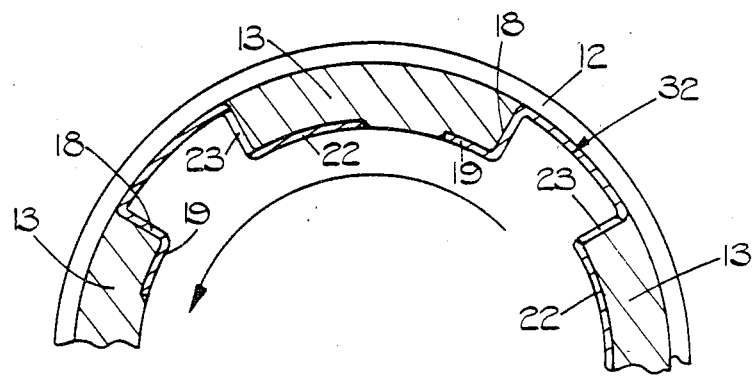
FIG. 8 is a view similar to FIG. 3 of a still further modification.
Figure 9:
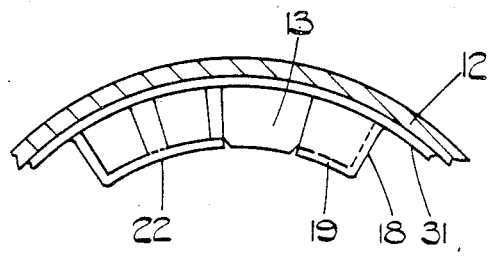
FIG. 9 is an end view of part of the construction shown in section in FIG. 8.
Figure 10:
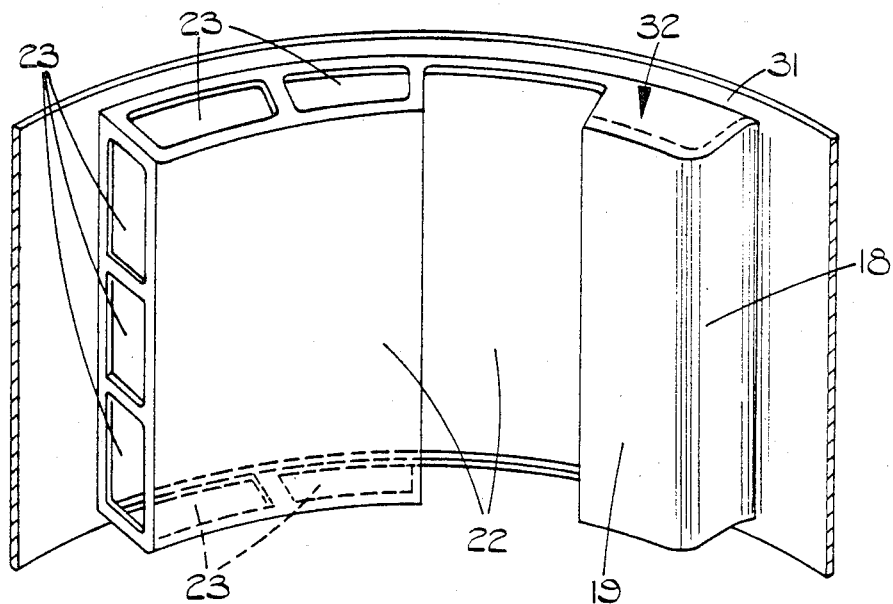
FIG. 10 is a perspective view, to an enlarged scale, of part of the pole retainer of FIGS. 8 and 9.

The arrangement illustrated in FIGS. 8, 9 and 10 again is a hoop formation, and in this instance is a press formed component. A cylinder of mild steel 31 defining the hoop is subjected at equi-angularly spaced points around its periphery to a press forming operation which produces in the exterior surface of the hoop a plurality of equi-angularly spaced pockets arranged to receive respective permanent magnet poles 13. The material of the hoop is relatively thin, and so the pockets produce shaped protrusions 32 on the interior of the hoop, the shaping of the pockets/protrusions is such that at one circumferential end of each pocket there is a strong tip shunt 18, 19 while at the opposite circumferential end there is a weak tip shield 22. As is particularly apparent from FIG. 10 each weak tip shield 22 is separated magnetically from the remainder of the hoop 31 by apertures 23 which ensure that there is just sufficient material linking the shield 22 to the hoop 31 to ensure the structural integrity of the shield 22 and the positive location of the pole 13 relative to the yoke 12. Again between each weak tip shield 22 and the corresponding shunt portion 19 there is an aperture 25 through which the arcuate face of the pole 13 is exposed. The stator can be assembled by locating the permanent magnet poles within the respective pockets of the hoop 31, and then sliding the hoop 31 axially into the yoke 12. Any convenient means is then provided for anchoring the portions of the hoop between the pockets to the yoke to achieve the appropriate axial and angular positioning of the permanent magnet poles 13 within the yoke.

Figure 12:
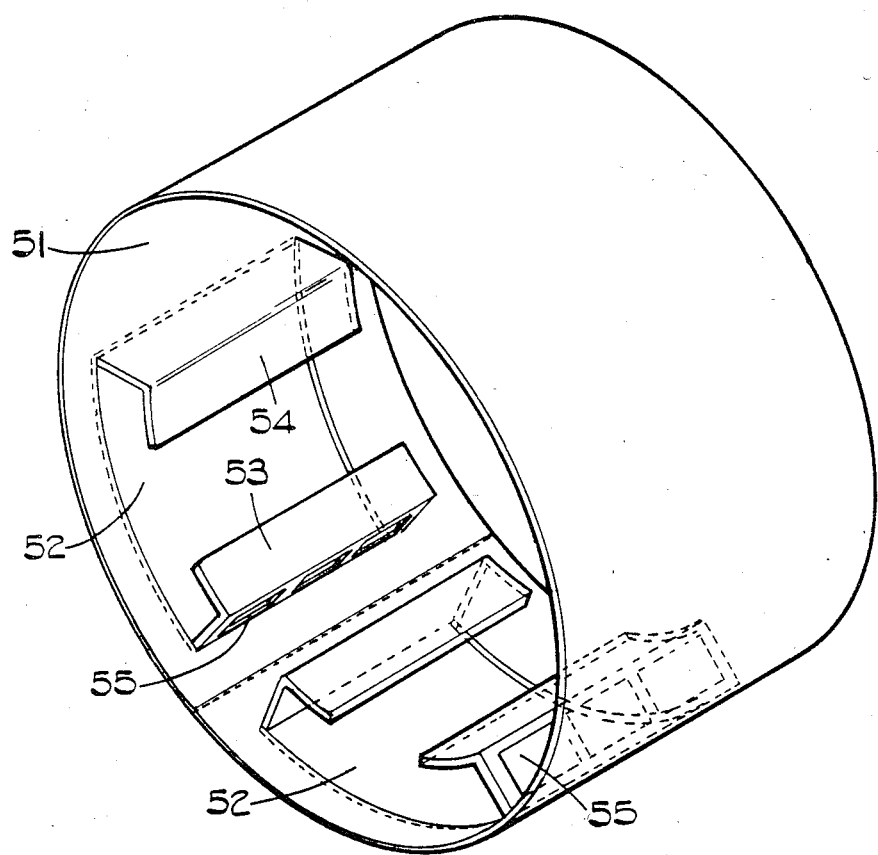
FIG. 12 is a diagrammatic perspective representation of a further alternative shunt and shield construction.

FIG. 12 illustrates diagrammatically an alternative hoop construction. A strip 51 of mild steel of length equal to the internal circumference of the yoke of the machine is punched at locations corresponding to the pole positions in the yoke to produce rectangular apertures 52. The punching forms flaps 53, 54 bent up from the strip and the flaps are bent to define the strong tip shunt and weak tip shield of each pole respectively. Thus the flap 53 defining the weak tip shield is pierced at 55 to ensure that there is insufficient metal in the radial limb to shunt flux from the weak tip to yoke. A possible disadvantage of this construction is that the pole arc coverage achieved by the shunt and shield is limited by the relationship between the radial thickness and the arcuate length of the poles. It will be understood that the strip 51 is bent to the cylindrical form shown and that the poles extend through the apertures 52. The ends of the strip 51 will abut if the strip length is actually equal to the yoke internal circumference and such abutment may be all that is required to lock the hoop in position. However if the ends of the strip 51 are spaced apart, or overlap, then additional securing means, for example, a wedge, screws, or rivets, will be needed.

It will be recognised that in those constructions disclosed above, where the shunts are parts of a hoop then the parts of the hoop which lie between the poles can be used to provide additional magnetic material in the interpolar connection region of the yoke. It follows from this that the yoke cylinder 12 can be produced from a thinner gauge of material than usual since some of the interpolar connection material is provided by the hoop.

Figure 13:
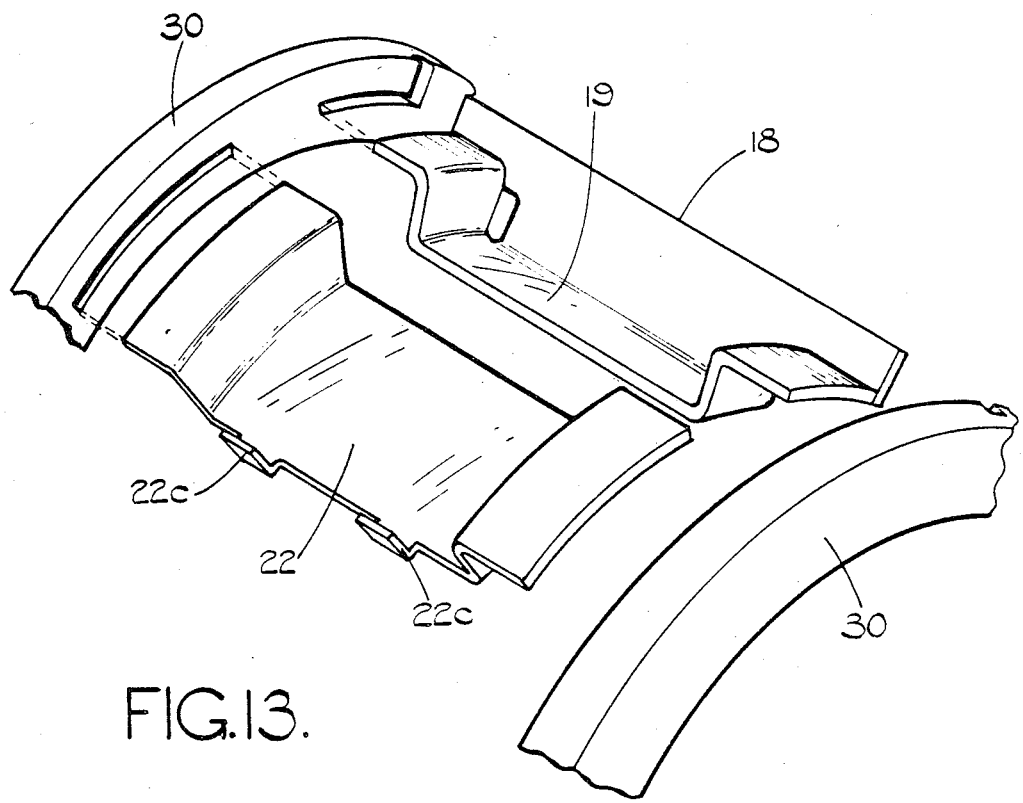
FIG. 13 is a perspective, exploded view of part of a still further construction.
Figure 14:
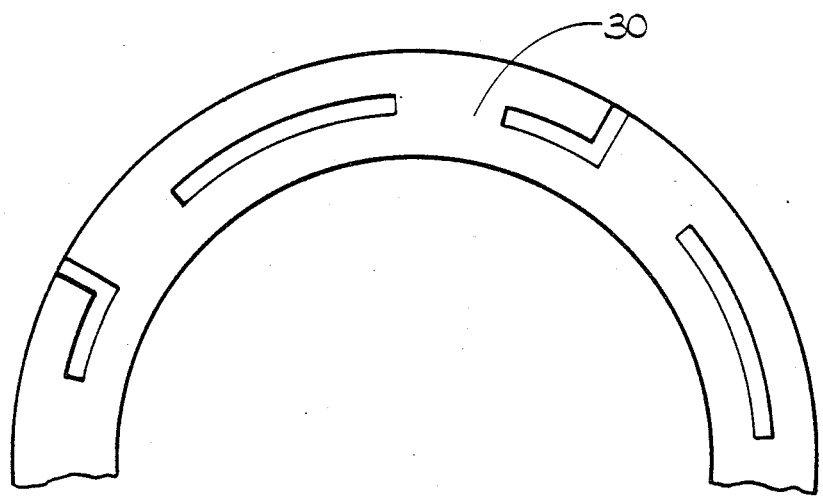
FIG. 14 is an end view of a ring component of FIG. 13.

In the alternative construction shown in FIGS. 13 and 14 there are both shunts 18 and weak tip shields 22 formed from mild steel strip. The shunts and shields are separate components held in position relative to one another by a pair of rings 30 of non-magnetic material. The rings 30 can be of die cast metal or moulded synthetic resin and can receive the ends of the shields and shunts in preformed slots 22b, 18b, in the rings or can be cast or moulded around the ends of the shields and shunts. The rings 30 can be secured to the end caps of the machine or to the through bolts which hold the end caps in place. As an alternative the rings could be integral parts of the end caps or of other non-magnetic portions of the machine structure. For example one of the rings could be part of the moulded brush box assembly of the machine. The shield 22 is shown as having upstanding tags 22c. The height of these is chosen to avoid contact with the machine yoke and the tags serve in conjunction with the radial limb of the shunt 18 to receive and locate between them, the respective permanent magnet pole.

It will be recognised that similar constructional principles can be utilized where the machine is to have a permanent magnet rotor rather than a permanent magnet stator, noting of course that where the permanent magnets are provided on the rotor then careful attention must be given to the securing of the magnets bearing in mind the additional loading imposed upon the magnets as the rotor rotates.

It is to be understood further that the strong tip shunt can be utilized with or without the weak tip shielding, although where weak tip shielding is desired then it is convenient to use both the shunt and the weak tip shield as part of the means for securing the poles in position.

The cross-sectional area of the radial limb of each shunt 18 is chosen to ensure that the radial limb will saturate in use. Thus although the shunt acts to reduce the magnet flux when the motor is operated in low armature current conditions, and so gives rise to an increase in armature speed, the flux crossing the air gap is increased in higher current conditions when the effect of armature reaction reverses the direction of flux flow in the shunt. This has the effect of increasing the useful flux in high armature current conditions, but the arrangement is such that the increase in useful flux is restricted to a level such that serious saturation of the armature teeth, and cogging, do not occur. The dimensions of the shunts 18, in particular the length (in a circumferential direction) of the portions 19 and the flux carrying ability of the shunt radial portions, will be determined by the intended application of the dynamo electric machine. However in most applications the arc of the portion 19 of each shunt will occupy between 10% and 50% inclusive, and desirably between 20% and 40% inclusive, of the arc of the pole with which the shunt is associated. The optimum arc will depend upon the desired performance characteristic of the machine. Moreover, where the shunt is used in conjunction with a weak tip shield, then the optimum pole arc coverage for both the shunt portion 19 and the weak tip shield will to some extent be a compromise between the required effects from both components, again determined primarily by the desired performance characteristics of the machine.

As higher torque values are required the current flowing in the armature windings is increased, and thus the armature reaction effect increases. The progressive increase in armature reaction causes a progressive decrease in the amount of the magnet (permanent magnet pole) flux being "shunted" until a point is reached at which the full magnet flux is re-established. As the current flowing in the armature windings increases further the armature reaction actually causes a reversal of the flux flow in the radial limb of the shunt thus contributing additional flux which could theoretically amount to 50% more than was obtained without the use of the shunt. However, the extent of additional flux will depend upon saturation of the magnetic circuit, particularly the armature teeth, and providing a correct balance is obtained between 10 and 30% additional flux may be obtained in practice in high current operating conditions. In an arrangement where the magnetic shunt is used in conjunction with a weak tip pole shield the arc of both the shunt and the shield will probably be best when 45% of the pole arc is covered by a weak tip shield, and 45% of the pole arc is covered by the portion 19 of the magnetic shunt leaving a 10% gap of the pole arc uncovered. These figures will of course vary in accordance with the desired performance characteristics of the machine. The 10% pole arc gap referred to should preferably be greater than the tooth arc of the armature teeth in order to avoid pulsation of flux, and consequent torque pulsations as the armature teeth pass the 10% gap between the weak tip shield and the shunt portion 19. However, in some cases the 10% gap could be a smaller dimension than the armature tooth arc, for example in an arrangement wherein the armature tooth geometry avoids detrimental flux pulsations.

Figure 11:
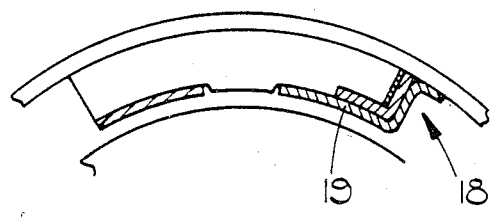
FIG. 11 is a sectional view of an alternative shunt construction.

It may be found advantageous to manufacture the magnetic shunt 18 in two or more parts in order to provide a thicker cross-section of iron in those regions where greater flux carrying capacity is required. Thus in FIG. 11 the radial limb of the shunt 18 consists of three layers of mild steel strip, whereas throughout part of its length the portion 19 consists of only a single layer of mild steel but in the region of the portion 19 adjacent the strong tip of the pole the portion 19 consists of two layers of mild steel.

It will be recognised that the amount of reduction of magnetic flux when the motor is operated in low armature current conditions is related to the percentage of the pole face which is covered by the shunt. However, increasing the arc of the flux shunt necessitates an increase in thickness in the steel used to manufacture the shunt and in turn necessitates a reduction in radial thickness of the magnet in the shunted region. Thus increasing the arc of coverage of the shunt has attendent manufacturing problems, and for a given application there will be an optimum arc of the pole face which is covered by the shunt.

FIGS. 15 to 18 illustrate arrangements which produce the effect of a large arc of coverage while retaining, so far as the shunt is concerned, the benefits of a smaller arc of coverage. Thus in FIG. 15 the arcuate length of each permanent magnet pole 13 is reduced by approximately 20% by comparison with an otherwise comparable machine of the kind shown for example in FIG. 8. The pole is still provided with a weak tip shield 22 and at the strong tip the shunt again includes a pole arc covering portion 19, a radial limb and a portion 21 engaging the yoke 11. In addition however the shunt has incorporated therewith an additional steel pole tip. Thus a steel member of L-shaped cross-section 61 has one limb 62 secured to the radial limb 18 of the shunt, and the opposite limb 63 extending co-planar with, and in the opposite direction from, the portion 19 of the shunt. Thus the face of the limb 63 forms a part cylindrical continuation of the part cylindrical face of portion 19.

Figure 15:
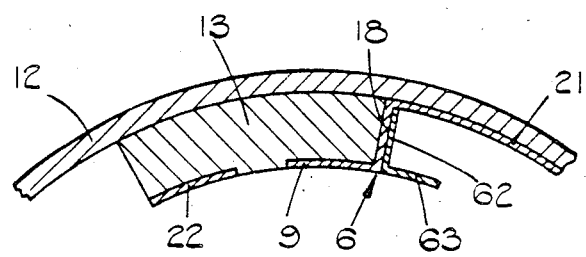
FIG. 15 is a view similar to FIG. 2 of a further modification.
Figure 16:
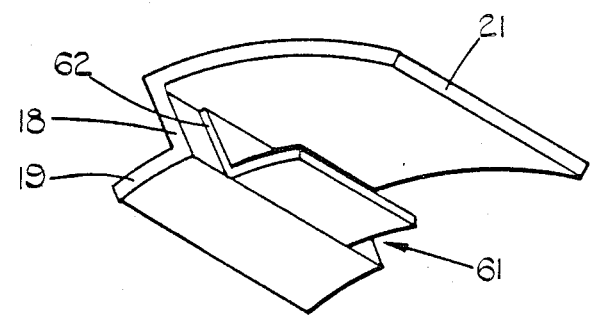
FIG. 16 is a perspective representation of the shunt construction of FIG. 15.
Figure 17:
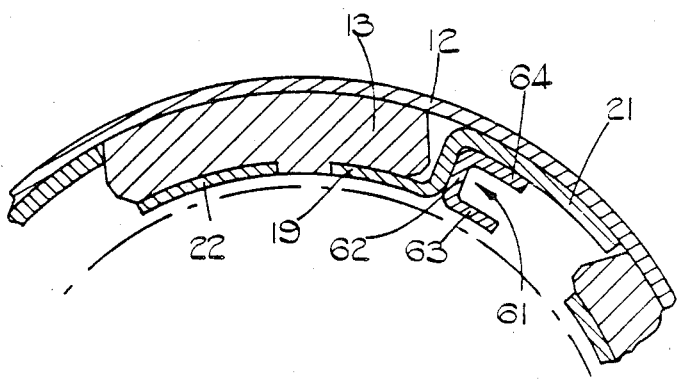
FIG. 17 is a view similar to FIG. 15 of an alternative.

As is evident from FIG. 16, the portion 19, portion 21, and radial limb of the shunt extend over the full axial length of the permanent magnet pole 13 with which they are associated. However, the pole tip member 61 is shorter, being substantial equal in axial length to the core 14 of the wound rotor of the machine. FIG. 17 illustrates an alternative arrangement to that shown in FIG. 15, the principle difference being that the member 61 is of U-shape, rather than L-shape cross-section, having, by comparison with the L-shape, an additional integral limb 64 which engages the portion 21 of the shunt.

Figure 18:
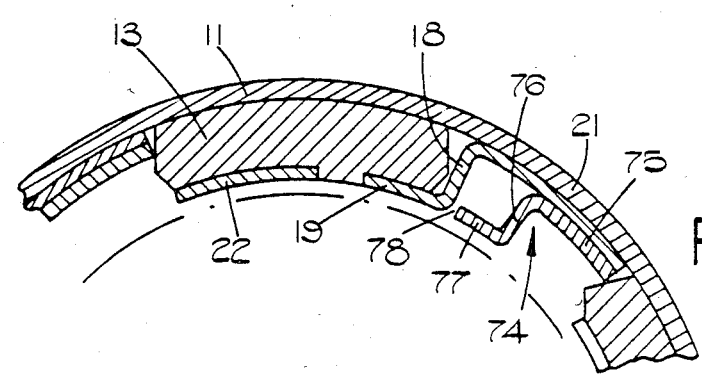
FIG. 18 is a view similar to FIG. 15 of a further alternative.

FIG. 18 illustrates a further alternative in which the additional steel pole tip is defined by a steel component 74 of Z-shape cross-section. The component 74 has a limb 75 which engages the portion 21 of the shunt, a radial portion 76 which extends parallel to, but circumferentially spaced from the radial limb of the shunt 19, and a circumferential portion 77 which extends towards, but does not touch, the portion 19 of the shunt. Thus an air gap 78 exists between the portion 19 of the shunt, and the continuation of the pole face defined by the portion 77 of the member 74. The use of an air gap 78 is advantageous in minimising the circumferential circulation of flux within the pole structure, and, provided that the portion 75 is of sufficient circumferential dimension the arrangement of FIG. 18 has the advantage of enhancing the cross-sectional thickness of magnetic material of the yoke 11.

In each of the constructions shown in FIGS. 15, 17 and 18, the arc of the magnetic pole 13 is reduced by approximately 20% by comparison with otherwise comparable arrangements. In each instance the portion 19 of the flux shunt is arranged to cover 20% of the pole arc, and the combination of 20% pole arc coverage by the portion 19, and a 20% reduction in the arc of the magnet itself can be thought of as together resulting in effectively shunting 40% of the pole arc. This in turn can be thought of as resulting in a low load flux which is approximately 50% of that which would be found in a comparable machine not equipped with shunts. The effect of the subsidiary steel pole is to extend the pole arc back to the normal value, but at the same time retaining the benefit of an apparent 40% pole arc shunt.

In each of the previous examples, the shunt portion 19 extends to the edge of the permanent magnet pole 13. FIGS. 19 to 22 illustrate two alternative embodiments wherein the pole face portion of the shunt terminates short of the extreme edge of the pole. Thus referring to FIGS. 19 and 20 the permanet magnet pole 13 is formed, adjacent its strong tip, with a hole extending from the air gap face of the pole 13 to the yoke 11. The hole is preferably in the form of an axially elongate slit 113 and houses a radial limb 120 of a strong tip shunt 118. The shunt 118 is generally of T-shape cross-section, the limb 120 being the leg of the T, and the cross piece 119 of the T extending throughout the full axial length of the pole 13 and being inset into the surface thereof.

Figure 19:
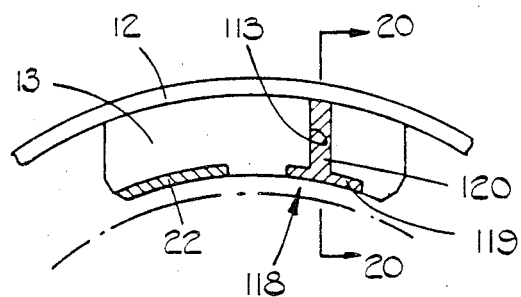
FIG. 19 is a view similar to FIG. 15 of a still further alternative.

As is clear from FIG. 19 the portion 119 does not extend to the extreme edge of the strong tip of the pole 13. Clearly the axial dimension of the radial limb 120 is less than that of the portion 119 so as not to divide the pole 13 into two pieces. The free end of the limb 120 can be secured to the yoke 11 in any convenient manner, and the securing of the limb 120 to the yoke can be used to assist in securing the permanent magnet pole 13 in position on the yoke.

Figure 20:
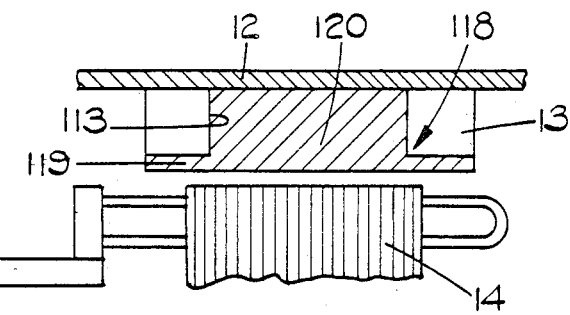
FIG. 20 is a sectional view on the line 20—20 of FIG. 19.
Figure 21:
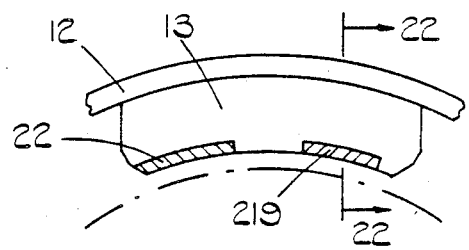
FIG. 21 is a view similar to FIG. 15 of yet a further alternative.
Figure 22:
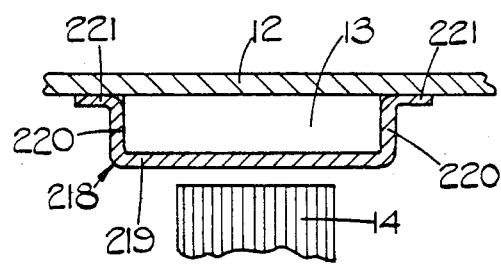
FIG. 22 is a sectional view on the line 22—22 of FIG. 21.

FIGS. 21 and 22 illustrate a modification of the arrangement shown in FIGS. 19 and 20 wherein the radial limb 120 passing through the permanent magnet pole 13 is dispensed with. In this instance the shunt is in the form of an axially extending strap 218 having a central portion 219 which is inset into the face of the pole 13 adjacent the edge of the strong tip of the pole, and which has at its ends radially extending portions 220 which extend along the axial end faces of the poles and are turned outwardly at their ends to form portions 221 engaging the inner surface of the yoke 11. As with the previous arrangement the portions 221 can be secured to the yoke in any convenient way, and can serve as securing means for securing the pole 13 in position on the yoke 11. By spacing the portion 119, 219 from the extreme edge of the strong tip region of the pole, the effect of armature reaction on the shunt itself is reduced by comparison with the previous arrangements and thus the positioning of the portion 119 in relation to the extreme edge of the strong tip region of the pole can be used to provide an adjustment in the characteristics of the machine.

With a view to reducing "cogging" and simplifying the construction in any of the constructions described above, it may prove desirable for the portion 19 of each shunt to be in the form of a flat plate rather than an arcuate plate as is shown in the drawings. If a flat plate is used then it will be so positioned that the air gap between the portion 19 of the shunt and the armature will taper to produce a relatively large gap at the pole tip tapering down to a minimum value adjacent, but not coinciding with, the centre line of the magnet. The magnet of course will be provided with a flat face against which the flat plate of the portion 19 of the shunt will seat. It may also prove desirable to omit the feature of insetting the portion 19 into the face of the permanent magnet pole. This will particularly be the case where the shunt is used in conjunction with a weak tip shield, since the amount of magnet material which is exposed between the weak tip shield and the portion 19 of the shunt is relatively small, and the improvement in the ease of manufacture of the magnet pole will offset the disadvantage of loosing the relatively small amount of magnetic material which otherwise would fill the gap between the shield and the shunt.

It will be recognised that the presence of the magnetic shunt associated with each permanent magnet pole can have a beneficial effect upon commutation. This beneficial effect arises from the shunt acting to reduce the magnetic flux in the interpolar space to a lower and less variable value than occurs in a permanent magnet machine not equipped with shunts. The commutation zone, that is to say that part of the interpolar arc which is aligned with the conductors of the armature which are electrically connected to the brushes by way of the commutator bars, should have a low value of flux density in order to prevent voltage being generated across each brush. It will be understood that when a voltage is generated across a brush a circulating current flows in the short circuited armature winding. Ideally the flux density should be opposite to that generated by armature reaction and in proportion to the current being carried by the brushes so as to help to reverse the current in the winding which is undergoing commutation. In a ferrite permanent magnet pole motor the high reluctance of the ferrite material causes a greater variation of flux density in the interpolar space than is conventionally obtained with wound field machines. This is a disadvantage of ferrite permanent magnet pole machines by comparison with wound machines, and thus an improvement in this area obtained by the use of a magnetic shunt is of significant benefit. Even greater benefit in this area is achieved by the use of a weak tip shield and a shunt in conjunction with each ferrite magnet pole. A further advantage of the presence of the magnetic shunt is that the shunt will protect against demagnetization of the strong tips of the poles in the event that, in the case of a motor, the power connections are made with their polarity reversed, or in the case of a generator the rotor thereof is rotated in the reverse direction.

It will be recognised that the foregoing examples and advantages are described in relation to a d.c. permanent magnet motor. However, the concept of a strong tip magnetic shunt can, with advantage, be applied also to d.c. permanent magnet generators, where the use of a shunt will have similar advantages to those discussed in relation to d.c. motors. Thus the magnetic shunt of each permanent magnet pole will reduce voltage at low currents and increase the voltage at high currents. This is a desirable feature in that the greater range of voltage between high and low current operation reduces the effect of resistive voltage drop.

Similarly, the use of a shunt in an a.c. permanent magnet generator is possible and may well be advantageous since the shunt would provide additional excitation with increasing current, whereas at low currents there would be a lowering in the flux attributable to the shunt, and hence there would be reduced iron losses. In a self current regulating automotive generator, the shunt will provide a steeper current/speed characteristic giving higher outputs in the most important speed range, typically 2000–4000 rev/min. In addition, at high speed and low loads, the shunts will reduce the generated voltage allowing the selection of lower voltage, and therefore lower cost, semi-conductor devices for controlling the d.c. output voltage.

The concept of the flux shunt can also improve the characteristics of synchronous motors. In a synchronous motor the pull-out torque (the approximate equivalent of lock torque in a d.c. motor) will be increased due to the increased flux provided by the stator current, whilst under low load conditions, the lower flux will give rise to lower iron losses.

It is to be recognised also that while cylindrical machines have been referred to previously, magnetic shunts can be applied to the poles of axial air gap machines such as are used as "thin" fan motors and low inertia servo motors. Moreover, while we have referred previously to permanent magnet motors operating on "clean" d.c. or the ripple d.c. obtained by rectification of an a.c. supply, it is to be understood that the use of a magnetic shunt is also applicable to permanent magnet motors which are operated in a variable speed configuration where a rectified a.c. supply is replaced by a supply via a triac, an SCR, or a transistor.

It has been found that the provision of a flux shunt has a protective effect on the associated permanent magnet pole in that the demagnetizing effect of the armature current is reduced. It is believed that the protective effect occurs as a result of the shunt "averaging" the flux over that portion of the pole arc which is covered by the shunt. In effect therefore the arc of the pole over which the armature current is effective is reduced by theoretically half the arc length of the shunt by this "averaging" effect thus reducing the number of "ampere-turns" subjecting the pole to demagnetization.

It should be noted that FIG. 15 shows an idealised pole and shunt shape whereas those shown in FIGS. 17, 18, 19 and 21 are more practical having regard to manufacturing techniques.

I claim:

1. A permanent magnet rotary dynamo electric machine wherein each permanent magnet pole has a weak tip region and a strong tip region and is provided at said strong tip region only with a flux shunt in the form of a shield of material of high saturation flux density engaging the air gap face of the strong tip region of the pole and also engaging the part of the iron circuit of the machine upon whch the permanent magnet pole is supported so as to provide a direct flux path between the air gap at the strong tip region of the pole and the iron circuit, said direct flux path being arranged to shunt magnet flux from said strong tip region of each pole to the iron circuit when the current in the associated winding is low, but to be saturated by flux flowing in the opposite direction at high values of winding current, there being no flux shunt at the weak tip region of each pole.

2. A machine as claimed in claim 1 wherein the flux shunt is physically secured to the part of the iron circuit upon which the permanent magnet pole is supported.

3. A machine as claimed in claim 2, wherein the flux shunt forms part of the means securing the permanent magnet pole to said part of the iron circuit.

4. A machine as claimed in claim 1, wherein each flux shunt is part of a pole securing clip, and the number of pole securing clips is equal to the number of poles, each pole securing clip being anchored to the part or the iron circuit upon which the permanent magnet poles are supported, at a position between circumferentially adjacent poles, and each clip having a first portion defining the flux shunt engaging the strong tip region of one of its adjacent poles, and a second portion constituting a weak tip shield of the next circumferentially adjacent pole.

5. A machine as claimed in claim 1 wherein each flux shunt is part of a single annular member formed from a material of high saturation flux density, the annular member engaging, at least by means of the flux shunts, each of the permanent magnet poles, and serving as at least part of the means for securing the poles to the part of the iron circuit of the machine upon which the poles are supported.

6. A machine as claimed in claim 5 wherein in addition to incorporating the appropriate number of flux shunts, the single annulus incorporates an equal number of appropriately positioned weak tip shields.

7. A machine as claimed in claim 1 wherein the parts of the air gap surface of the permanent magnet poles which are engaged by the flux shunts are recessed to receive the flux shunts so that the air gap surface of the flux shunt is flush with the remainder of the air gap surface of its respective permanent magnet pole.

8. A machine as claimed in claim 4 wherein the parts of the air gap surface of the permanent magnet poles which are engaged by the flux shunts are recessed to receive the flux shunts so that the air gap surface of the flux shunt is flush with the remainder of the air gap surface of its respective permanent magnet pole.

9. A machine as claimed in claim 5 wherein the parts of the air gap surface of the permanent magnet poles which are engaged by the flux shunts are recessed to receive the flux shunts so that the air gap surface of the flux shunt is flush with the remainder of the air gap surface of its respective permanent magnet pole.

10. A machine as claimed in claim 1 wherein the length of the airgap face of each permanent magnet pole which is engaged by the respective shunt is not greater than 50% and not less than 10% of the length of the airgap face of the permanent magnet pole measured in a circumferential direction.

11. A machine as claimed in claim 4 wherein the length of the airgap face of each permanent magnet pole which is engaged by the respective shunt is not greater than 50% and not less than 10% of the length of the airgap face of the permanent magnet pole measured in a circumferential direction.

12. A machine as claimed in claim 5 wherein the length of the airgap face of each permanent magnet pole which is engaged by the respective shunt is not greater than 50% and not less than 10% of the length of the airgap face of the permanent magnet pole measured in a circumferential direction.

13. A machine as claimed in claim 10, wherein said airgap face coverage is not greater than 40% and not less than 20%.

14. A machine as claimed in claim 11 wherein said airgap face coverage is not greater than 40% and not less than 20%.

15. A machine as claimed in claim 1 wherein part of the circumferential extent of a permanent magnet pole is replaced, at the strong tip end thereof, by a steel pole member associated with the respective flux shunt.

16. A machine as claimed in claim 15 wherein the steel pole member is circumferentially co-extensive with the airgap face engaging portion of the respective flux shunt.

17. A machine as claimed in claim 15, wherein an airgap exists between said steel pole member and said airgap face engaging portion of the respective flux shunt.

18. A machine as claimed in claim 1 wherein a flux shunt extends over the whole axial length of the respective pole and terminates, in a circumferential direction, short of the edge of the strong tip region of the pole.

19. A machine as claimed in claim 18, wherein the flux shunt includes a portion extending through an aperture in the respective pole to engage the part of the iron circuit upon which the pole is supported.

* * * * *